(12) United States Patent
Zhang

(10) Patent No.: US 9,544,492 B2
(45) Date of Patent: Jan. 10, 2017

(54) CAMERA NETWORK AND METHOD OF OPERATING THEREOF

(71) Applicant: EYEDEAS Ltd., Sheung Wan (HK)

(72) Inventor: Fan Zhang, Sheung Wan (HK)

(73) Assignee: EYEDEAS LTD., Hong Kong (HK)

( * ) Notice: Subject to any disclaimer, the term of this patent is extended or adjusted under 35 U.S.C. 154(b) by 0 days.

(21) Appl. No.: 14/333,700

(22) Filed: Jul. 17, 2014

(65) Prior Publication Data

US 2016/0021292 A1    Jan. 21, 2016

(51) Int. Cl.
| | |
|---|---|
| *H04N 5/232* | (2006.01) |
| *H04N 5/06* | (2006.01) |
| *H04N 5/247* | (2006.01) |
| *H04N 5/225* | (2006.01) |

(52) U.S. Cl.
CPC ............ *H04N 5/23206* (2013.01); *H04N 5/06* (2013.01); *H04N 5/247* (2013.01)

(58) Field of Classification Search
CPC ...... H04N 5/23206; H04N 5/06; H04N 5/247; H04N 5/2258; H04N 5/23222

USPC .......... 348/143, 211.99, 211.3, 211.1, 211.2, 348/211.4, 211.11, 159; 725/105
See application file for complete search history.

(56) References Cited

U.S. PATENT DOCUMENTS

| | | | |
|---|---|---|---|
| 2008/0303903 A1* | 12/2008 | Bentley ............ | G08B 13/19606 348/143 |
| 2010/0289900 A1* | 11/2010 | Ortiz ..................... | H04N 5/232 348/159 |
| 2013/0128052 A1* | 5/2013 | Catrein et al. ......... | H04N 7/181 348/159 |

\* cited by examiner

*Primary Examiner* — Tuan Ho
*Assistant Examiner* — Marly Camargo
(74) *Attorney, Agent, or Firm* — Ware, Fressola, Maguire & Barber LLP

(57) ABSTRACT

A method for operating a camera network having a plurality of cameras, comprising the steps of: communicating with the plurality of cameras to determine one or more operation parameters for each of the plurality of cameras; synchronizing the one or more operation parameters for each of the plurality of cameras; and coordinating a capture of multimedia data using the plurality of cameras with the one or more synchronized operation parameters.

20 Claims, 15 Drawing Sheets

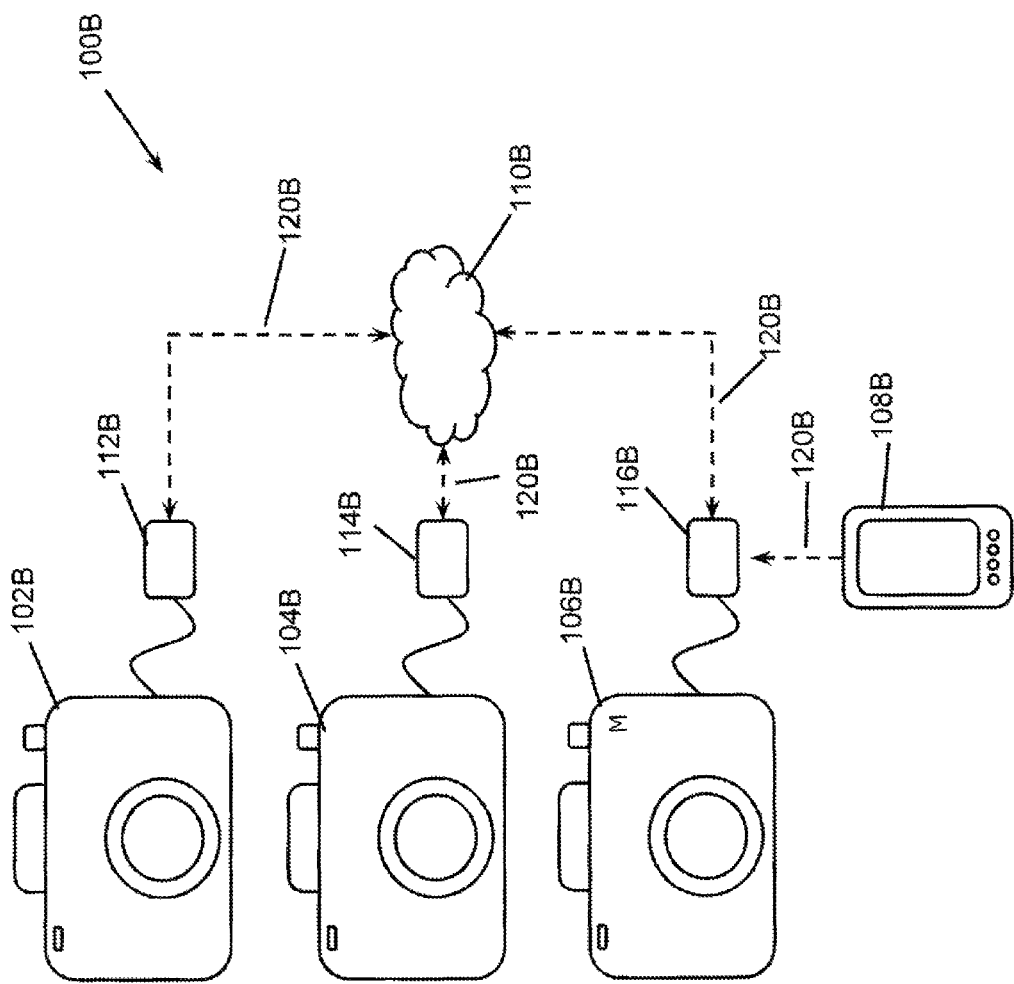

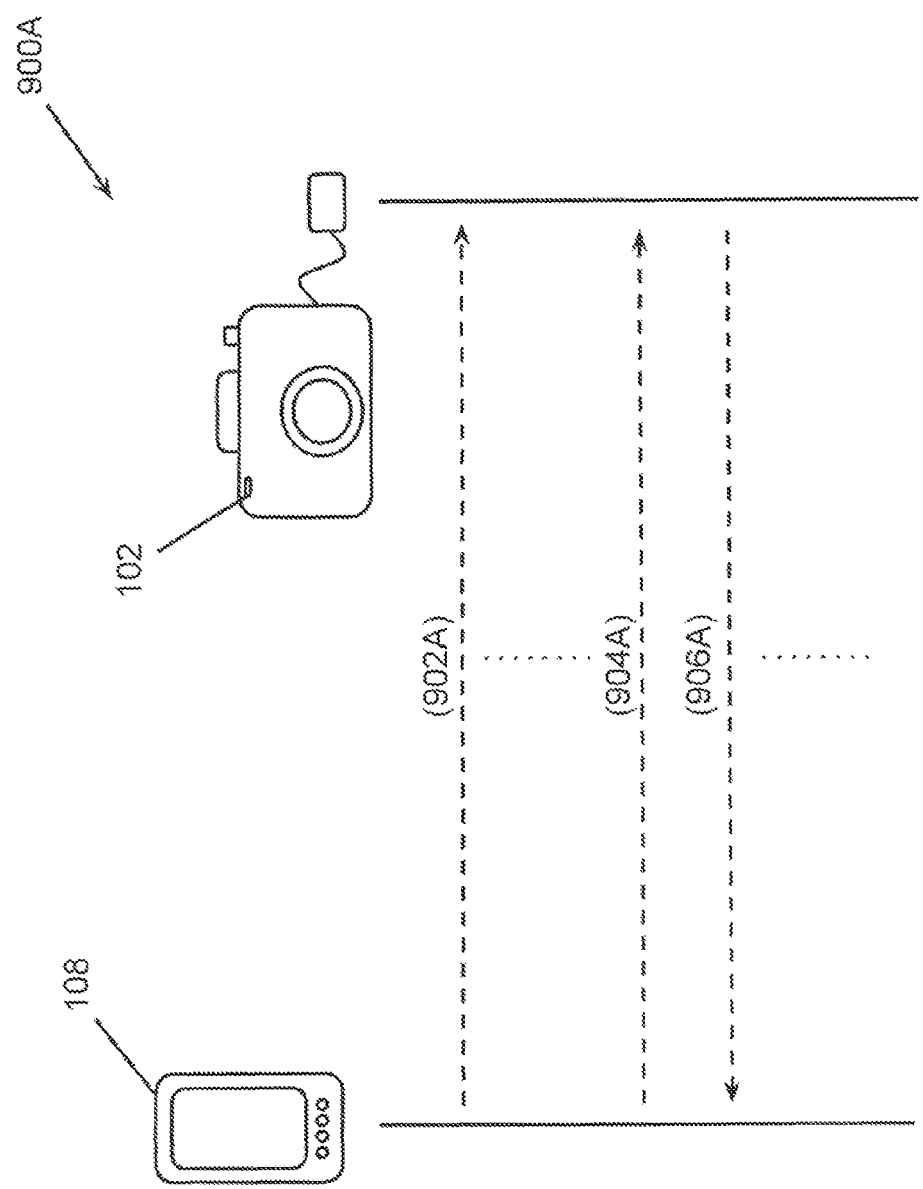

CAMERA NETWORK AND METHOD OF OPERATING THEREOF

TECHNICAL FIELD

The present invention relates to a method of operating a camera network with a number of cameras and particularly, although not exclusively, to a method for controlling and synchronizing the operation of a number of cameras in a camera network.

BACKGROUND

Cameras are optical instruments used for capturing still or moving images (and/or sound). Generally, cameras can be classified into two main categories, a point and shoot (P&S) type and a single lens reflex (SLR) type. Both of these types are now predominantly digital, but they may also use film to record an image.

P&S type cameras have all the optical and/or electrical instruments arranged in the camera body and the operation of P&S type camera is largely automatic. Users of P&S cameras can readily capture images by pointing the camera to the object or image to be captured and actuating the shutter. Thus, P&S cameras are simpler for use and are relatively small in size and more compact.

SLR type cameras, on the other hand, allow a larger degree of user manipulation as the lens of these cameras is readily changeable. Users of SLR cameras will often have to manipulate the optical and/or electrical instruments of the cameras before capturing an image. Thus, the quality of images taken using SLR cameras will often depend on the photographic skills of the user. Also, SLR cameras are relatively large and more bulky compared with P&S cameras.

Nonetheless, in some photographic (photo or video) applications, it may be necessary to capture still or moving images using different cameras at the same time. However, different types of cameras (or different varieties of cameras of the same type) will often have different operation characteristics. This presents a significant challenge for realizing real time synchronous/synchronized photographic (photo or video) shooting with a plurality of cameras of different types.

SUMMARY OF THE INVENTION

In accordance with a first aspect of the present invention, there is provided a method for operating a camera network having a plurality of cameras, comprising the steps of: communicating with the plurality of cameras to determine one or more operation parameters for each of the plurality of cameras; synchronizing the one or more operation parameters for each of the plurality of cameras; and coordinating a capture of multimedia data using the plurality of cameras with the one or more synchronized operation parameters.

In one embodiment of the first aspect, the step of communicating with the plurality of cameras includes facilitating communication with or between each of the plurality of cameras.

In one embodiment of the first aspect, the one or more operation parameters for each of the plurality of cameras are arranged to be synchronized to the one or more operation parameters of one of the plurality of cameras.

In one embodiment of the first aspect, the one or more operation parameters include a time base and/or a frame rate.

In one embodiment of the first aspect, communicating with the plurality of cameras to determine a time base for each of the plurality of cameras comprises the steps of: transmitting at least one communication signal to each of the plurality of cameras; and receiving at least one corresponding response signal from each of the plurality of cameras.

In one embodiment of the first aspect, synchronizing the time base of the plurality of cameras to the time base of the one of the plurality of cameras comprises the steps of: determining a transmission time difference for each of the plurality of camera based on a difference between a transmission time of the communication signal and a receiving time of the corresponding response signal; and adjusting a clock time of each of the plurality of cameras based on the determined transmission time difference such that the time base of each of the plurality of cameras is synchronized to the time base of the one of the plurality of cameras.

In one embodiment of the first aspect, synchronizing the time base of the plurality of cameras to the time base of the one of the plurality of cameras comprises the steps of: determining a plurality of transmission time difference for each of the plurality of camera, wherein each of the plurality of transmission time difference for each of the plurality of camera is determined based on a difference between a transmission time of the communication signal and a receiving time of the corresponding response signal; determining an averaged transmission time difference for each of the plurality of cameras based on the plurality of transmission time differences determined for each of the plurality of cameras; and adjusting a clock time of each of the plurality of cameras based on the determined averaged transmission time difference such that the time base of each of the plurality of cameras is synchronized to the time base of the one of the plurality of cameras.

In one embodiment of the first aspect, the synchronization of the frame rate for each of the plurality of cameras comprises minimizing the frame offset among the plurality of cameras in the camera network to be within a predetermined threshold or to be substantially zero.

In one embodiment of the first aspect, communicating with the plurality of cameras to determine a frame rate of each camera comprises the steps of: transmitting a frame start signal to each of the plurality of cameras upon each frame initiation at the one of the plurality of cameras; and determining a frame time difference at each of the plurality of cameras based on a time difference between at least two consecutive frame start signals received.

In one embodiment of the first aspect, synchronizing the frame rate for each of the plurality of cameras includes: comparing the determined frame time difference between at least two consecutive frame start signals received with a frame time difference of each of the plurality of cameras; and maintaining the frame time difference of each of the plurality of cameras to be within a predetermined range so as to substantially conform to the frame time difference of the one of the plurality of cameras.

In one embodiment of the first aspect, maintaining the frame time difference of each of the plurality of cameras to be within a predetermined range includes: adjusting a frame rate of the cameras of which the frame time difference is beyond the predetermined range by altering the frame time difference of the respective camera such that the frame offset of the plurality of cameras is minimized to be within a predetermined threshold or to be substantially zero.

In one embodiment of the first aspect, the step of coordinating the capture of multimedia data using the plurality of cameras with synchronized time base and frame rate includes: transmitting a targeted initiation time to each of the plurality of cameras; and initializing the capture of multimedia data using the plurality of cameras at the same targeted initiation time.

In one embodiment of the first aspect, the step of coordinating the capture of multimedia data using the plurality of cameras with synchronized time base and frame rate further includes: dynamically adjusting the time base and the frame rate of the plurality of cameras when the plurality of cameras are capturing multimedia data such that the time base of the plurality of cameras remain synchronized and the frame offset among the cameras is minimized to be within a predetermined threshold or to be substantially zero during operation.

In one embodiment of the first aspect, the step of coordinating the capture of multimedia data using the plurality of cameras with synchronized time base and frame rate includes: detecting a triggering event for triggering the initiation of the capturing of multimedia data; transmitting an initialization command to each of the plurality of cameras; and initializing the obtaining of multimedia data using the plurality of cameras in response to the triggering event.

In one embodiment of the first aspect, detection of the triggering event includes detection of a tactile signal, an infrared signal, an electromagnetic signal, a light signal, or an audible signal.

In one embodiment of the first aspect, the multimedia data includes image, video or sound.

In one embodiment of the first aspect, the communication with or among the plurality of cameras is performed over a wireless communication link.

In one embodiment of the first aspect, the wireless communication link is a WiFi or Bluetooth communication link, or other wireless communication links.

In one embodiment of the first aspect, the plurality of cameras are digital cameras each coupled with a communication module for enabling wireless communication.

In accordance with a second aspect of the present invention, there is provided a system for operating a camera network having a plurality of cameras, comprising: means for communicating with the plurality of cameras to determine one or more operation parameters for each of the plurality of cameras; means for synchronizing the one or more operation parameters for each of the plurality of cameras; and means for coordinating a capture of multimedia data using the plurality of cameras with the one or more synchronized operation parameters.

In one embodiment of the second aspect, the means for communicating with the plurality of cameras is arranged to facilitate communication with or between each of the plurality of cameras.

In one embodiment of the second aspect, the one or more operation parameters for each of the plurality of cameras are arranged to be synchronized to the one or more operation parameters of one of the plurality of cameras.

In one embodiment of the second aspect, the one or more operation parameters include a time base and/or a frame rate.

In one embodiment of the second aspect, the means for communicating with the plurality of cameras to determine a time base for each of the plurality of cameras is arranged to: transmit at least one communication signal to each of the plurality of cameras; and receive at least one corresponding response signal from each of the plurality of cameras.

In one embodiment of the second aspect, the means for synchronizing the time base of the plurality of cameras to the time base of the one of the plurality of cameras is arranged to: determine a transmission time difference for each of the plurality of camera based on a difference between a transmission time of the communication signal and a receiving time of the corresponding response signal; and adjust a clock time of each of the plurality of cameras based on the determined transmission time difference such that the time base of each of the plurality of cameras is synchronized to the time base of the one of the plurality of cameras.

In one embodiment of the second aspect, the means for synchronizing the time base of the plurality of cameras to the time base of the one of the plurality of cameras is arranged to: determine a plurality of transmission time difference for each of the plurality of camera, wherein each of the plurality of transmission time difference for each of the plurality of camera is determined based on a difference between a transmission time of the communication signal and a receiving time of the corresponding response signal; determine an averaged transmission time difference for each of the plurality of cameras based on the plurality of transmission time differences determined for each of the plurality of cameras; and adjust a clock time of each of the plurality of cameras based on the determined averaged transmission time difference such that the time base of each of the plurality of cameras is synchronized to the time base of the one of the plurality of cameras.

In one embodiment of the second aspect, the means for synchronizing the frame rate for each of the plurality of cameras is arranged to minimize the frame offset among the plurality of cameras in the camera network to be within a predetermined threshold or to be substantially zero.

In one embodiment of the second aspect, the means for communicating with the plurality of cameras to determine a frame rate of each camera is arranged to: transmit a frame start signal to each of the plurality of cameras upon each frame initiation at the one of the plurality of cameras; and determine a frame time difference at each of the plurality of cameras based on a time difference between at least two consecutive frame start signals received.

In one embodiment of the second aspect, the means for synchronizing the frame rate for each of the plurality of cameras is arranged to: compare the determined frame time difference between at least two consecutive frame start signals received with a frame time difference of each of the plurality of cameras; and maintain the frame time difference of each of the plurality of cameras to be within a predetermined range so as to substantially conform to the frame time difference of the one of the plurality of cameras.

In one embodiment of the second aspect, the means for synchronizing the frame rate for each of the plurality of cameras is further arranged to: adjusting a frame rate of the cameras of which the frame time difference is beyond the predetermined range by altering the frame time difference of the respective camera such that the frame offset of the plurality of cameras is minimized to be within a predetermined threshold or to be substantially zero.

In one embodiment of the second aspect, the means for coordinating the capture of multimedia data using the plurality of cameras with synchronized time base and frame rate is arranged to: transmit a targeted initiation time to each of the plurality of cameras; and initialize the capture of multimedia data using the plurality of cameras at the same targeted initiation time.

In one embodiment of the second aspect, the means for coordinating the capture of multimedia data using the plurality of cameras with synchronized time base and frame rate is arranged to: dynamically adjust the time base and the frame rate of the plurality of cameras when the plurality of cameras are capturing multimedia data such that the time base and the frame rate of the plurality of cameras remain synchronized during operation.

In one embodiment of the second aspect, the means for coordinating the capture of multimedia data using the plurality of cameras with synchronized time base and frame rate is arranged to: detect a triggering event for triggering the initiation of the capturing of multimedia data; transmit an initialization command to each of the plurality of cameras; and initialize the obtaining of multimedia data using the plurality of cameras in response to the triggering event.

In one embodiment of the second aspect, detection of the triggering event includes detection of a tactile signal, an infrared signal, an electromagnetic signal, a light signal, or an audible signal.

In one embodiment of the second aspect, the multimedia data includes image, video or sound.

In one embodiment of the second aspect, the communication with or among the plurality of cameras is performed over a wireless communication link.

In one embodiment of the second aspect, the wireless communication link is a WiFi or Bluetooth communication link, or other wireless communication links.

In one embodiment of the second aspect, the plurality of cameras are digital cameras each coupled with a communication module for enabling wireless communication.

BRIEF DESCRIPTION OF THE DRAWINGS

Embodiments of the present invention will now be described, by way of example, with reference to the accompanying drawings in which:

FIG. 1B is a camera network with a number of cameras and a controller in accordance with another embodiment of the present invention;

FIG. 9A illustrates a coordination process for capturing multimedia data using a number of cameras (controlled by a controller) in the camera network of FIG. 1A;

DETAILED DESCRIPTION OF THE PREFERRED EMBODIMENT

Figure 1A:
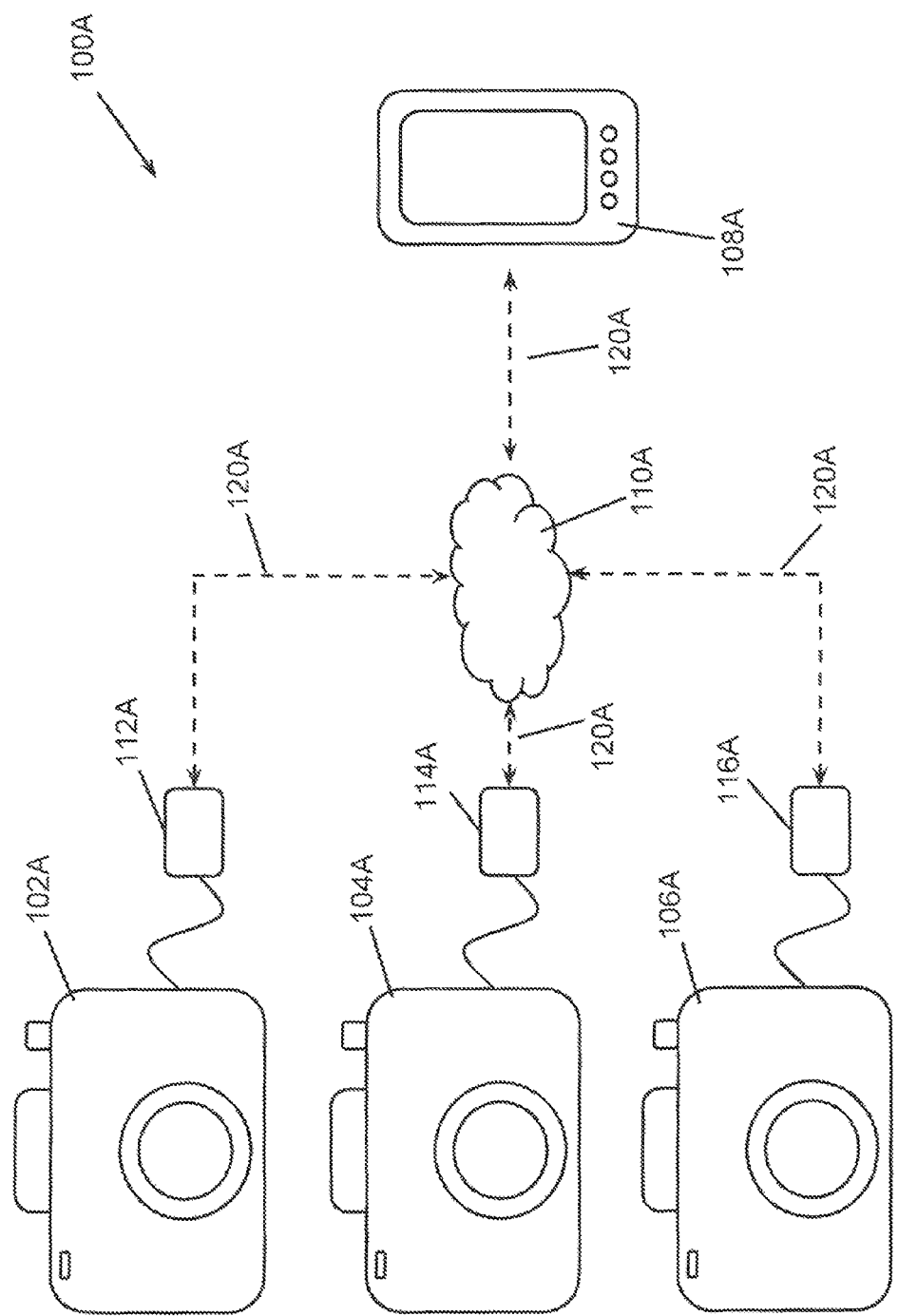
FIG. 1A is a camera network with a number of cameras and a controller in accordance with one embodiment of the present invention.

FIG. 1A shows a camera network 100A with a number of cameras 102A, 104A, 106A in accordance with one embodiment of the present invention. In this embodiment, the camera network 100A includes three cameras 102A, 104A, 106A and one controller 108A. The cameras 102A, 104A, 106A in the camera system 100A, which may have their operation characteristics/parameters originally out of synchronization due to the differences caused by their internal components such as the clock crystals, are arranged to capture still or moving images (and/or sound) simultaneously in a synchronized manner using the method provided in the present invention. Each of the cameras 102A, 104A, 106A is equipped with necessary optical and electrical components for capturing still or moving images and/or sound. As shown in FIG. 1A, each camera 102A, 104A, 106A is further coupled with an electronic module 112A, 114A, 116A having at least one communication means for enabling communication with other cameras (or their associated electronic modules 112A, 114A, 116A) and the controller in the camera network 100A through a wireless communication network 110A. The cameras 102A, 104A, 106A may be coupled with the electronic modules 112A, 114A, 116A through preferably a wired connection, or alternatively, a wireless connection.

The controller 108A in the camera system of FIG. 1A is arranged to communicate with each of the cameras 102A, 104A, 106A (or their associated electronic modules 112A, 114A, 116A) in the camera network 100A so as to synchronize the time base and/or the frame rate and reduce the frame offset (difference between frame start times of different cameras) of the cameras to realize simultaneous synchronized operation of the cameras in the camera network 100A. In the present embodiment, the synchronization of the time base refers to the minimization of differences in the time base of different cameras 102A, 104A, 106A in the camera system 100A. On the other hand, the reduction in frame offset among the cameras 102A, 104A, 106A in the camera system 100A is realized by a continuous adjustment of the frame rate of each of the cameras. Preferably, an administrator of the camera network 100A can control the activation, synchronization and operation of the cameras 102A, 104A, 106A in the camera network 100A through the controller 108A. In one embodiment, the time base of each of the cameras 102A, 104A, 106A are synchronized to a time base set in the controller 108A. Also, the frame offset among the cameras 102A, 104A, 106A and the controller 108A is minimized by adjustment of the frame rates of the cameras 102A, 104A, 106A. Alternatively, the controller 108A may use the time base and frame rate from one of the cameras, say camera 102A, as reference and adjusts the time base and frame rate of the other cameras 104A, 106A in the camera network 100A to that of the reference so as to synchronize the time base and minimize the frame offset of the cameras 102A, 104A, 106A in the camera network 100A.

In FIG. 1A, the cameras 102A, 104A, 106A and the controller 108A are in communication each other through a wireless communication network 110A. Preferably, the wireless communication network 110A utilizes wireless communication links such as WiFi, Bluetooth, communication links 120A. Other electromagnetic or optical communication signals may also be used as communication links in some other embodiments.

FIG. 1B shows another camera network 100B in accordance with one embodiment of the present invention. In this embodiment, the camera network 100B includes three cameras 102B, 104B, 106B and one controller 108B. The cameras 102B, 104B, 106B in the camera system 100B, which may have their operation characteristics/parameters originally out of synchronization due to the differences caused by their internal components such as the clock, are arranged to capture still or moving images (and/or sound) simultaneously in a synchronized manner using the method provided in the present invention. Each of the cameras 102B, 104B, 106B is equipped with necessary optical and electrical components for capturing still or moving images and/or sound. As shown in FIG. 1B, each camera 102B, 104B, 106B is further coupled with an electronic module 112B, 114B, 116B having at least one communication means for enabling communication with other cameras 102B, 104B, 106B (or their associated electronic modules 112B, 114B, 116B) in the camera network 100B through the wireless communication network 110B. The cameras 102B, 104B, 106B may be coupled with the electronic modules 112B, 114B, 116B through preferably a wired connection, or alternatively, a wireless connection.

Unlike in the embodiment of FIG. 1A, the controller 108B in the camera system 100B of FIG. 1B is arranged to communicate with only one of the cameras 106B in the camera network 100B. In this embodiment, the camera 106B in communication with the controller 108B serves as a 'master' camera (the camera with a mark 'm' on the body) for controlling and synchronizing the operation of the cameras 102B, 104B, 106B in the camera network. Preferably, the 'master' camera 106B is operable to synchronize the time base and/or the frame rate and reduce the frame offset (difference between frame start times of different cameras) of the cameras 102B, 104B, 106B to realize simultaneous synchronized operation of the cameras in the camera network 100B. In the present embodiment, the synchronization of the time base refers to the minimization of differences in the time base of different cameras 102B, 104B, 106B in the camera system 100B. On the other hand, the reduction in frame offset among the cameras 102B, 104B, 106B in the camera system 100B is realized by a continuous adjustment of the frame rate of the cameras. An administrator of the camera network 100B can control the activation, synchronization and operation of the cameras 102B, 104B, 106B in the camera network 100B through the controller 108B as well as the 'master' camera 106B. In this embodiment, the time base of each of the cameras 102B, 104B, 106B are synchronized to the time base of the 'master' camera 106B, whereas the frame offset in the camera system 100B is minimized by adjustment of the frame rates of the cameras 102B, 104B in the camera system.

Figure 1C:
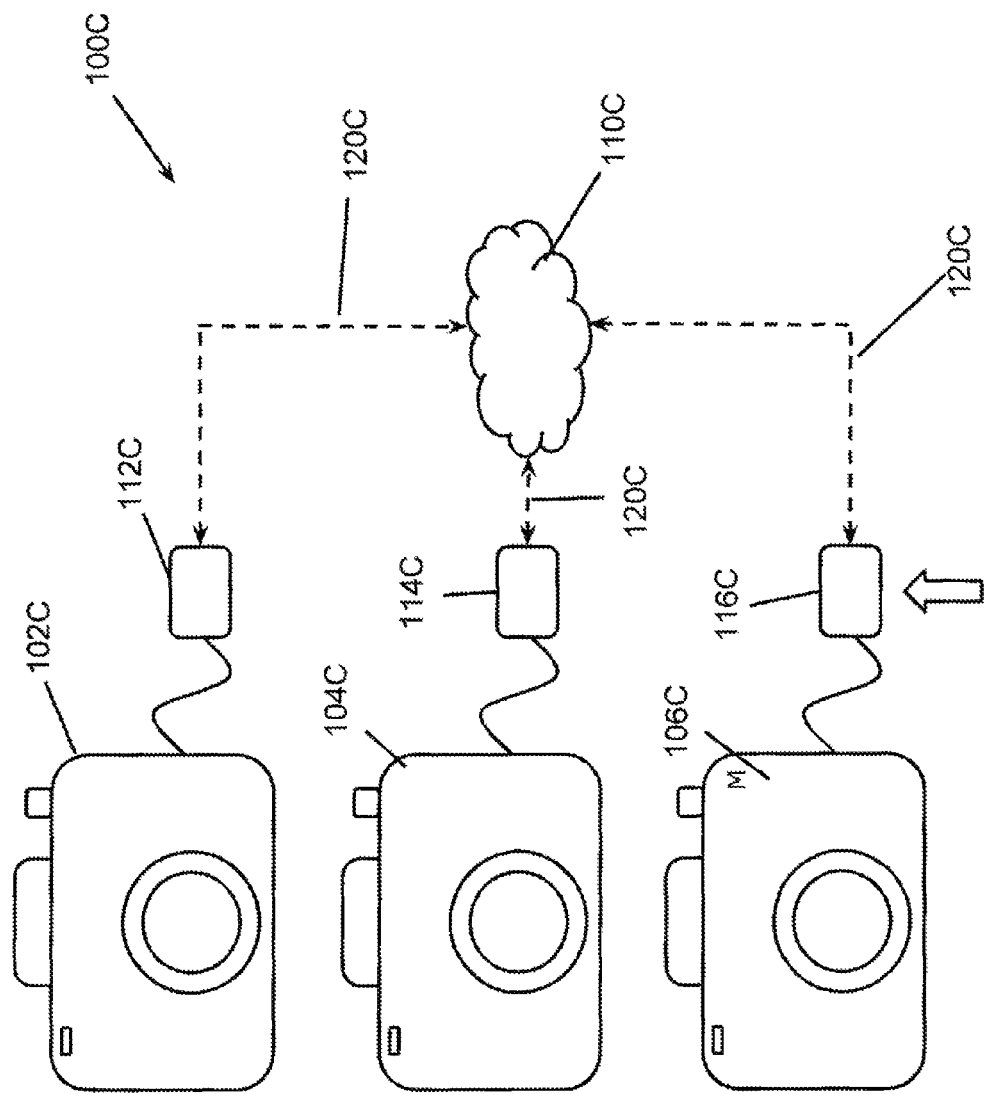
FIG. 1C is a camera network with a number of cameras in accordance with yet another embodiment of the present invention.

FIG. 1C shows yet another camera network 100C in accordance with one embodiment of the present invention. In this embodiment, the camera network 100C includes three cameras 102C, 104C, 106C. The cameras 102C, 104C, 106C in the camera system 100C, which may have their operation characteristics/parameters originally out of synchronization due to the differences caused by their internal components such as the clock, are arranged to capture still or moving images (and/or sound) simultaneously in a synchronized manner, using the method provided in the present invention. Each of the cameras 102C, 104C, 106C is equipped with necessary optical and electrical components for capturing still or moving images and/or sound. As shown in FIG. 1C, each camera 102C, 104C, 106C is further coupled with an electronic module 112C, 114C, 116C having at least one communication means for enabling communication with other cameras 102C, 104C, 106C in the camera network 100C through a wireless communication network 110C. The cameras 102C, 104C, 106C may be coupled with the electronic modules 112C, 114C, 116C through preferably a wired connection, or alternatively a wireless connection.

Unlike in the embodiments of FIGS. 1A and 1B, the camera network 100C in FIG. 1C does not have any controllers. In this embodiment, one of the cameras 106C serves as a 'master' camera (the camera with a mark 'm' on the body) for controlling and synchronizing the operation of the cameras 102C, 104C, 106C in the camera network 100C. The electronic module 116C of the 'master' camera in this embodiment further includes a sensor arranged to detect an external stimulus/event so as to trigger the activation, operation and/or synchronization of the cameras 102C, 104C, 106C in the camera system 100C. Preferably, the 'master' camera 106C is operable to synchronize the time base and/or the frame rate and reduce the frame rate (difference between frame start times of different cameras) of the cameras 102C, 104C, 106C to realize simultaneous synchronized operation of the cameras in the camera network 100C. In this embodiment, the time base of the cameras 102C, 104C are synchronized to the time base of the 'master' camera 106C whereas the frame offset in the camera system 100C is minimized by adjustment of the frame rates of the cameras 102C, 104C in the camera system, in a similar manner to that in the embodiment of FIG. 1B.

Although the camera networks as shown in FIGS. 1A, 1B and 1C all include three cameras and one controller, a person skilled in the art would readily appreciate that the number of cameras and controllers may be freely chosen, without deviating from the spirit of the invention. Also, although the electrical modules are shown to be separate components from the cameras in FIGS. 1A, 1B and 1C, in some other embodiments, the electrical modules may be integrated as an internal component of the cameras. In the present invention, the cameras in the camera network may be of the same type or of different types, for example, the cameras may be different varieties of point and shoot cameras or single lens reflex cameras.

Figure 2:
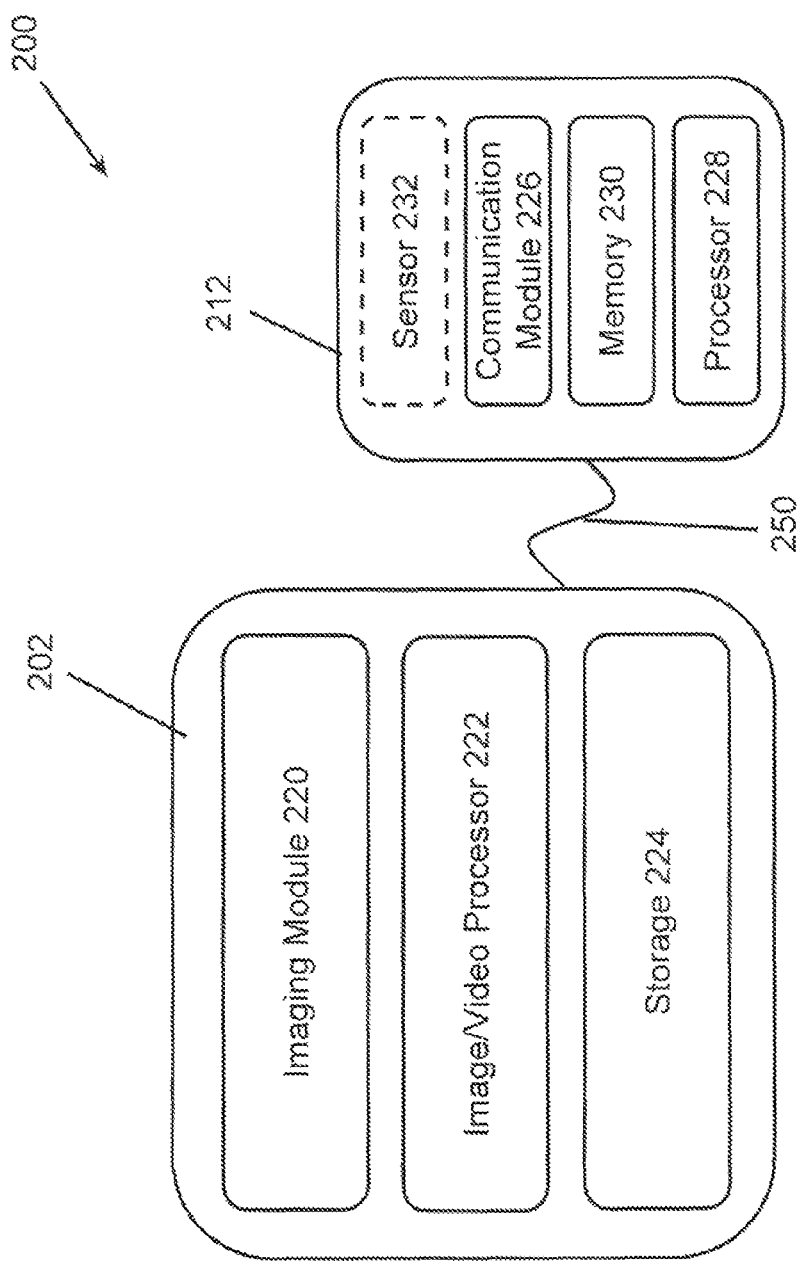
FIG. 2 is a block diagram showing the key functional modules of a camera in the camera network of FIG. 1A, 1B or 1C.

FIG. 2 shows a block diagram 200 of the components of the camera and of the electronic module coupled to the camera in accordance with one embodiment of the present invention. Preferably, the camera is coupled with the electronic module 212 through a wired connection, or alternatively, through a wireless connection. In this embodiment, the camera 202 includes an imaging module 220 arranged to capture still or moving image and/or sound. Preferably, the imaging module 220 includes a number of optical and electronic components such as display, control, lens, shutter, clock etc. In addition, the camera 202 may also include an image and video processor 222 arranged to process the captured image or video. A storage module 224 may be provided in the camera for storing the multimedia data obtained using the camera. In one embodiment, the storage 224 may be provided by an external storage media attachable to the camera, such as a USB, micro-USB, data card, etc. Although not specifically shown, the camera may also have other modules such as a communication module for enabling the transfer of multimedia data, for example, to a server through a wireless network or to a computer through a wired connection.

Also shown in FIG. 2 is the electronic module 212 coupled to the camera 202 through a communication link 250 for enabling communication of the camera 202 with other electronic modules, cameras and/or controllers in a camera system, or other external electronic devices. In one embodiment, a number of communication links may be established at a time to enable simultaneous communication with a number of different electronic devices. Preferably, a communication module 226 is provided in the electronic module 212 and the communication module is operable to communicate wireless communication signals, such as WiFi and Bluetooth signals, or other electromagnetic or optical signals with the other electronic modules, cameras and/or controllers in a camera system. The electronic module 212 may also include a processor 228 for processing information arranged to synchronize the cameras in a camera network. In one embodiment, the processor 228 may be arranged to process signals, data or operation parameters such as time base and frame signals received from other electronic modules, cameras and/or controllers in the camera system, and/or to control the local operation parameters such as time base and frame rate of the camera of which it is attached to.

A memory module 230 may be provided in the electronic module 212 for storing communication or processed signals, data and information. In one embodiment, the memory module for the electronic module coupled to the 'master' camera may store a list containing information related to the cameras in the camera network. This information may be, for example, a camera identifier for each camera, together with a log of entries or operation parameters or communication information of each of the cameras. In some embodiments, electronic module 212 may further include a sensing module 232 arranged to detect an external stimulus/event so as to trigger the operation of the camera 220 and/or the synchronization and control of the cameras. For example, the sensing module 232 may be a tactile sensor, a light sensor, an electromagnetic signal sensor, an audio signal sensor arranged to detect force, light, EM signals, audible signals, etc.

In the present description, for simplicity, the term 'camera' may refer to a camera itself or may refer to a camera coupled with an electronic module as shown in FIG. 2.

Preferably, the electronic module 230 in FIG. 2 is arranged to communicate with an external electronic device such as an information processing system. Examples of such information processing system include a computer, a tablet, a PDA, or preferably, a mobile phone. In one example, the information processing system comprises suitable hardware or software components necessary to receive, store and execute appropriate computer instructions. The components may include a processing unit, read-only memory (ROM), random access memory (RAM), input/output devices, input device, display means, sensors, control means and communications links. The information processing system may include instructions that may be included in ROM, RAM or disk drives and may be executed by the processing unit. A plurality of communication links may be provided for the information processing system for connecting to one or ore electronic modules (or cameras) in a camera network.

It should be noted that one or more of the functional modules in the electronic module as shown in FIG. 2 may be integrated with the camera. In other words, the electronic module may have additional components or may be some of the components removed; whilst the camera may have additional components/modules for operation of the camera in the camera network. In one example, all functional modules in the electronic modules are integrated with the camera such that the cameras do not require an additional electronic module.

Figure 3:
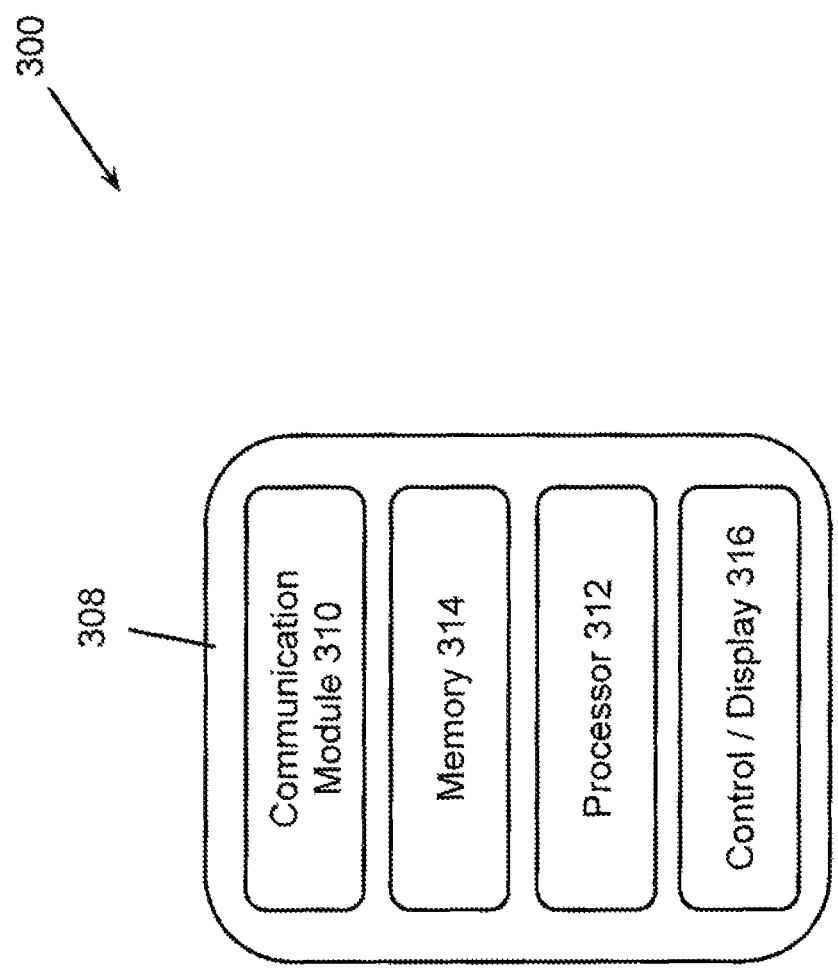
FIG. 3 is a block diagram showing the key functional modules of a controller in the camera network of FIG. 1A, 1B or 1C.

FIG. 3 shows a block diagram 300 of the components of the controller 308 in the camera network in accordance with one embodiment of the present invention. In one embodiment, the controller 308 includes a communication module 310 arranged to enable communication with electronic modules coupled with the cameras, and/or controllers in the camera system. Preferably, the communication module 310 is operable to communicate wireless communication signals, such as WiFi and Bluetooth signals, or other electromagnetic or optical signals with the other electronic modules, cameras and/or controllers in the camera system. The controller 308 may also include a processor 312 for processing information that is used to synchronize the cameras in the camera network. In one embodiment, the processor 312 may be arranged to process signals, data or operation parameters received from electronic modules coupled with the cameras, and/or controllers in the camera system.

A memory module 314 may be provided in the controller 308 for storing communication or processed signals, data and information. Preferably, the memory module 314 may store a list containing information related to the cameras in the camera network. This information may be, for example, camera identifiers for each camera, together with a log of entries or operation parameters or communication information of each of the cameras in the camera network. A control and display means 316 may be provided in the controller 308 for facilitating an administrator of the camera network to interact with the controller 308 and hence the operation, synchronization, and initiation of the cameras in the camera network. The control and display means 316 may include a display screen with or without touch sensors, and/or control buttons.

In one embodiment, the controller may be an information processing system, such as a mobile phone, a desktop computer, a laptop computer, a PDA, or a tablet, having operable processing, memory, input/output, and/or display means with various software and hardware architectures for enabling communication with the cameras (and/or the electronic module coupled thereto) and for controlling/synchronizing the operation of cameras in the camera system.

Figure 4:
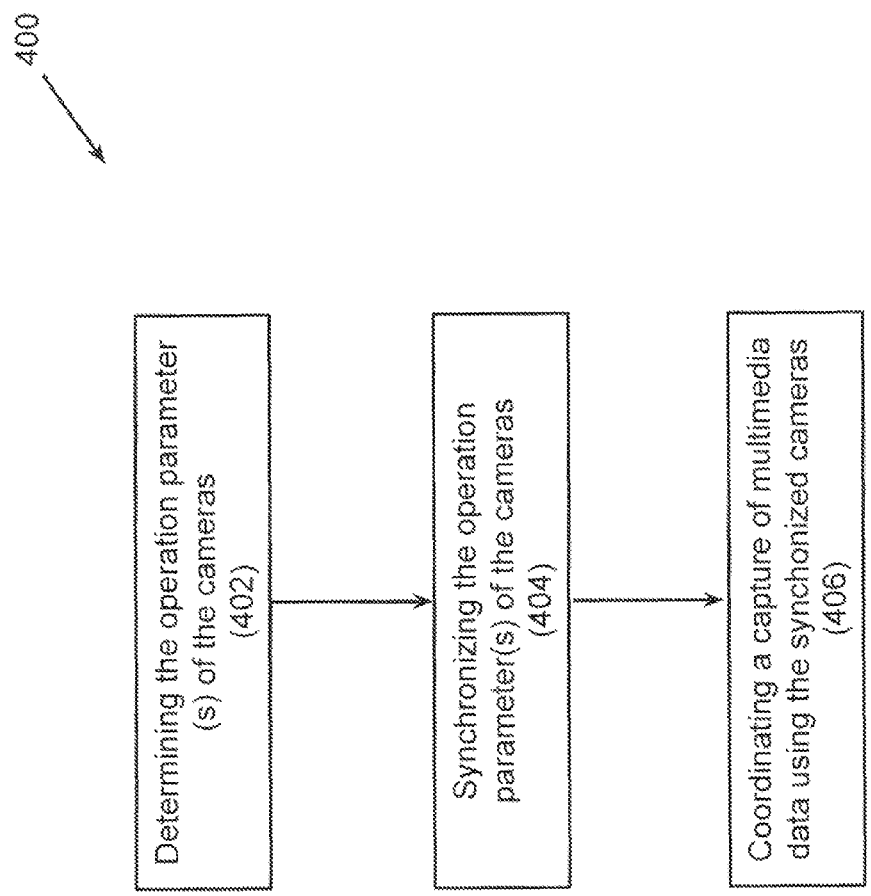
FIG. 4 shows a flow diagram illustrating the basic operation of the camera network of FIG. 1A, 1B or 1C.

As shown in FIG. 4, there is provided a method for operating a camera network having a plurality of cameras, comprising the steps of: communicating with the plurality of cameras to determine one or more operation parameters for each of the plurality of cameras; synchronizing the one or more operation parameters for each of the plurality of cameras; and coordinating a capture of multimedia data using the plurality of cameras with the one or more synchronized operation parameters.

FIG. 4 shows the basic operation flow 400 of the camera networks of FIGS. 1A, 1B and 1C. In one embodiment, the camera networks of FIGS. 1A, 1B and 1C operates by first determining the operation parameters including the time base and frame rate of the cameras in the camera network in step (402). Upon determining the time base and frame rate of the cameras in the camera network, different time bases of different cameras are synchronized with each other whereas different frame rates of different cameras are adjusted or "synchronized" so as to minimize the frame offset among the cameras in step (404). In one embodiment, this process involves synchronizing the time base and frame rate of each camera to a reference time base and a reference frame rate, which may be a time base and frame rate set in the controller (in the embodiment of FIG. 1A); or may be the time base and frame rate of one of the camera, the 'master' camera (in the embodiments of FIGS. 1B and 1C). Once the synchronization process in completed, the cameras with the time bases synchronized, and the frame offset minimized, are ready for capturing multimedia data such as still or moving images and/or sound. As shown in step (406), this then involves coordinating the capture or multimedia data using the synchronized cameras. In one embodiment, the initiation of the capturing of multimedia data is coordinated by the controller (in the embodiment of FIG. 1A) or alternatively, by the 'master' camera (in the embodiments of FIGS. 1B and 1C). The controller or the 'master' camera may transmit a triggering signal with a triggering time code to the cameras in the camera network to initiate the multimedia capture process, based on the distance between the controller on the 'master' camera and the cameras in the camera network. In some other embodiments, the 'master' camera may be responsive to an external triggering event that initiates the multimedia capture process. Exemplary triggering events include a tactile signal, an infrared signal, an electromagnetic signal, a light signal, or an audible signal received at the 'master' camera. During the multimedia capturing process, the controller or the 'master' camera is arranged to monitor, coordinate and/or adjust the frame rate and time base of the cameras in the camera network such that the time base of different cameras remain synchronized and the frame offset of the cameras is minimized during the multimedia capturing process by continuously adjusting and synchronizing the frame rate.

Figure 5A:
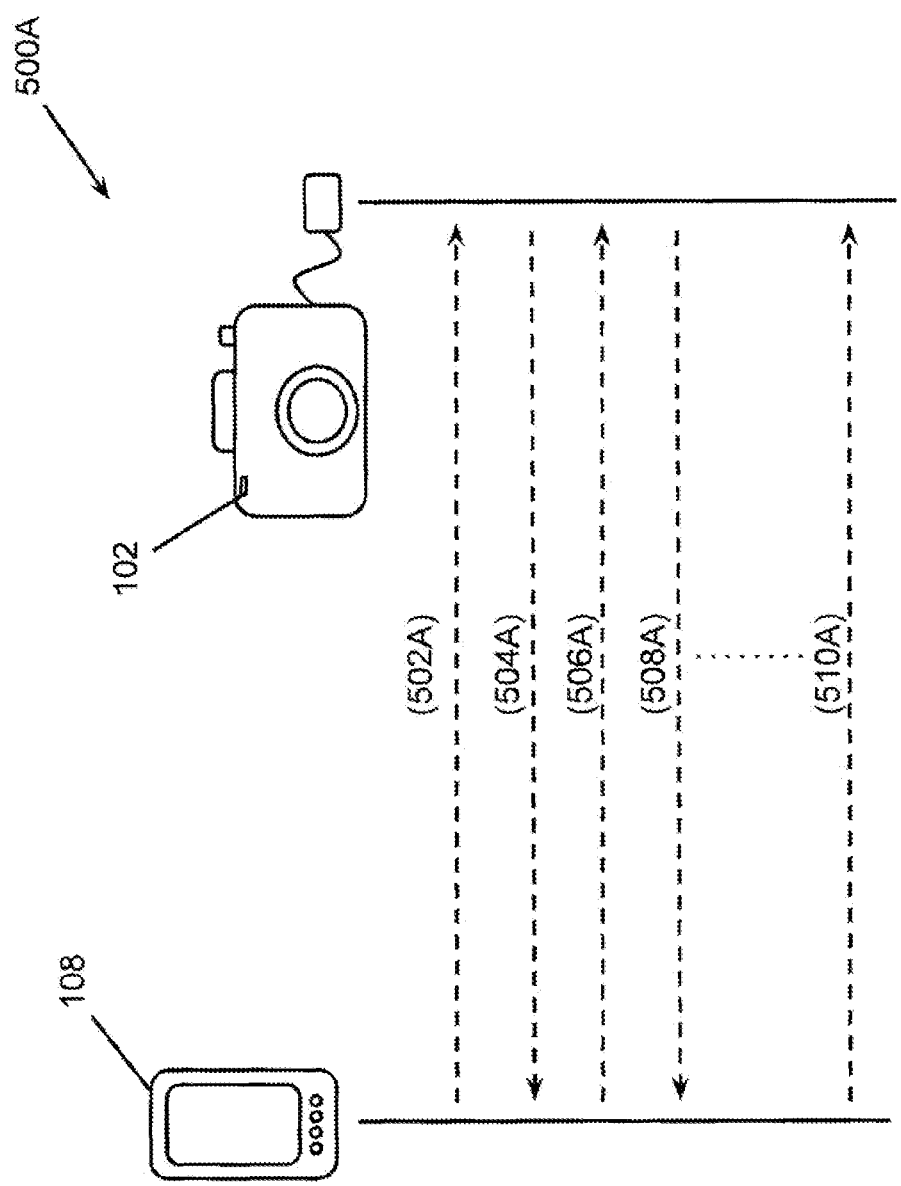
FIG. 5A illustrates a time base synchronization process between the controller and the camera in the camera network of FIG. 1A.
Figure 5B:
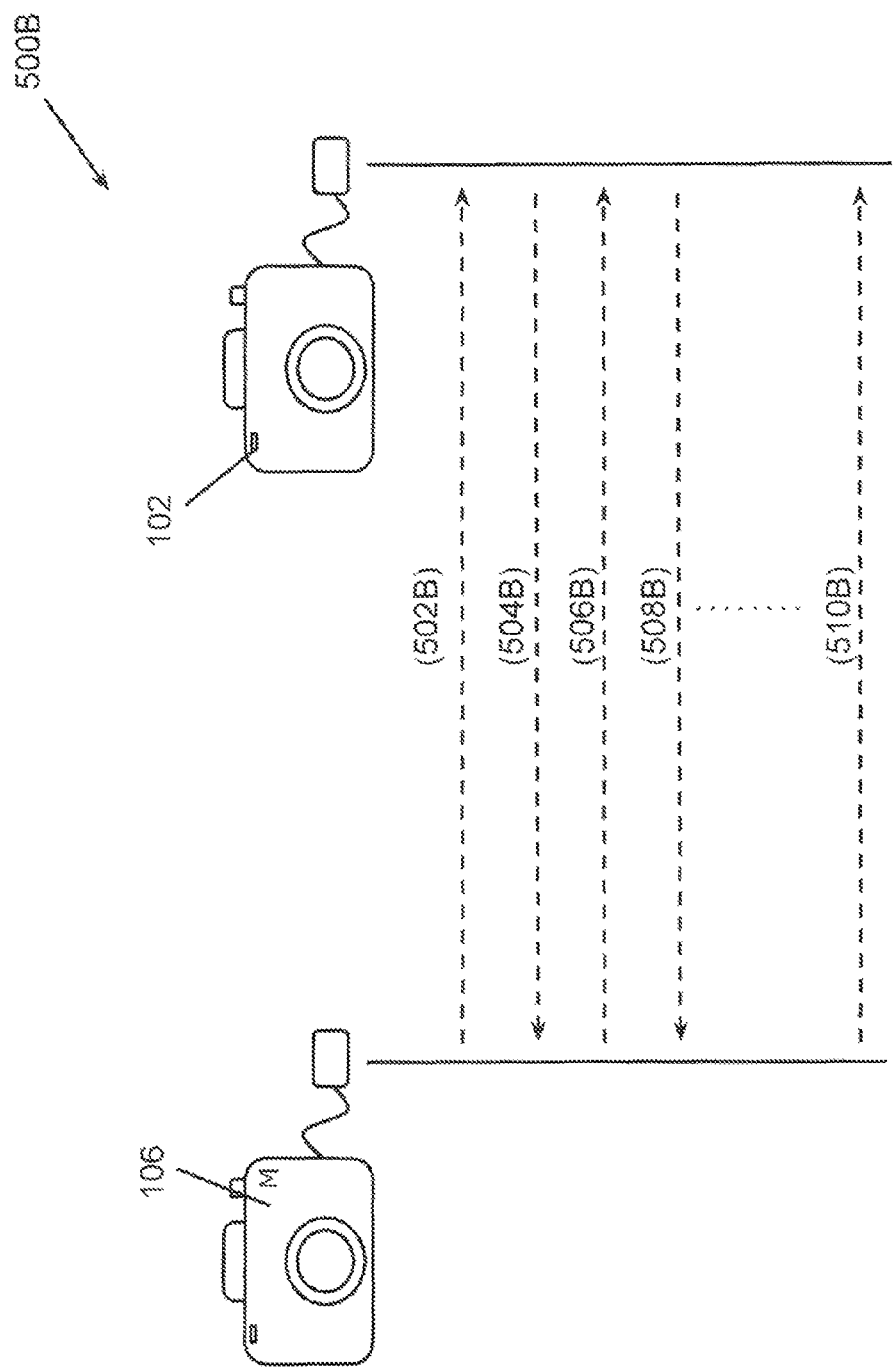
FIG. 5B illustrates a time base synchronization process between two cameras in the camera network of FIG. 1B or 1C.

FIGS. 5A and 5B show the process 500A, 500B for synchronizing the time base between the controller 108 and one of the camera 102 (coupled with electronic module 112) in the camera network (embodiment of FIG. 1A), and between the 'master' camera 106 (coupled with electronic module 116) and one of the other cameras 102 (coupled with electronic module 112) in the camera network (embodiments of FIGS. 1B and 1C). Although only one camera to be synchronized is shown in FIGS. 5A and 5B, a person skilled in the art could readily appreciate that the controller 108 or the 'master' camera 106 is operable to repeat the time base synchronization process for different cameras in the camera network so as to synchronize the time base of each of the cameras in the camera network.

Initially, the controller, the 'master' camera, and the other cameras in the camera network may have different time base (e.g. clock time). This difference in time base may be due to different clock crystals or other internal components used in different cameras, but may be compensated through adjustments using the processors of the cameras. In order to synchronize the time base of camera 102 to that of the controller 108 or the 'master' camera 106, the controller 108 or the 'master' camera 106 first transmits a communication signal to camera 102 in step (502A, 502B). Camera 102, upon receiving the communication signal from the controller 108 or the 'master' camera 106, transmits a response signal back to the controller 108 or the 'master' camera 106 in step (504A, 504B). Preferably, the communication signal and the response signal include a time code and/or a camera identifier.

Upon receiving the response signal, the controller 108 or the 'master' camera 106 determines a difference between the time for transmitting the communication signal and the time for receiving the response signal. This may be performed by using the time codes in the communication and response signals, or using the time log in the controller 108 or the 'master' camera 106. Preferably, the controller 108 or the 'master' camera 106 then determines the time (one-way) required for a signal to be transmitted from the controller 108 or the 'master' camera 106 to camera 102, i.e. the time difference between the time for transmitting the communication signal and the time for receiving the response signal divided by two. Optionally, the controller 108 or the 'master' camera 106 may repeat the above determination process to obtain an averaged time difference required to transmit a signal from the controller 108 or the 'master' camera 106 to camera 102 for improved accuracy by transmitting and hence receiving additional signals as shown in steps (506A, 506B; 508A, 508B). Although in the embodiments shown in FIGS. 5A and 5B, the transmission and response signals are transmitted one at a time, in other embodiments, a number of consecutive transmission signals may be sent at a time from the controller 108 or the 'master' camera 106 and a number of consecutive response signals may be received at the controller 108 or the 'master' camera 106.

In the present invention, the time difference may depend on the nature of the transmission signal, the operation environment of the camera network or the distance between the controller or the 'master' camera and the other camera, etc.

Based on the determined time difference/averaged time difference, the controller 108 or the 'master' camera 106 transmits a time base synchronization signal with a time code and the time difference/averaged time difference between the controller 108 or the 'master' camera 106 and camera 102, as shown in step (510A, 510B). In the embodiment of FIG. 5A, the controller 108 may select the clock of one of the cameras as a reference, or alternatively, may use its own clock as a reference. Upon receiving the time base synchronization signal at camera 102, camera 102 adjusts its clock time by setting its clock time based on the time code and the time difference/averaged time difference received. Preferably, camera 102 adjusts its clock time to be a time determined by the sum of the time in the time code and the time difference/averaged time difference. In a preferred embodiment, the time base difference after synchronization may be less than several milliseconds. For example, the time code may be 1:00:30.08, and time difference may be 10 ms. Camera 102, which may initially has a time code of 1:00:40.00, upon receiving the 1:00:30.08 time code and the 10 ms time difference/averaged time difference from the controller 108 or the 'master' camera 106, adjusts its clock time to be 1:00:30.09 such that its clock time is synchronized with that of the controller 108 or the 'master' camera 106 (the controller 108 or the 'master' camera 106 would have frame rate time of 1:00:30.09 by the time camera 102 adjusts its clock time).

Figure 6:
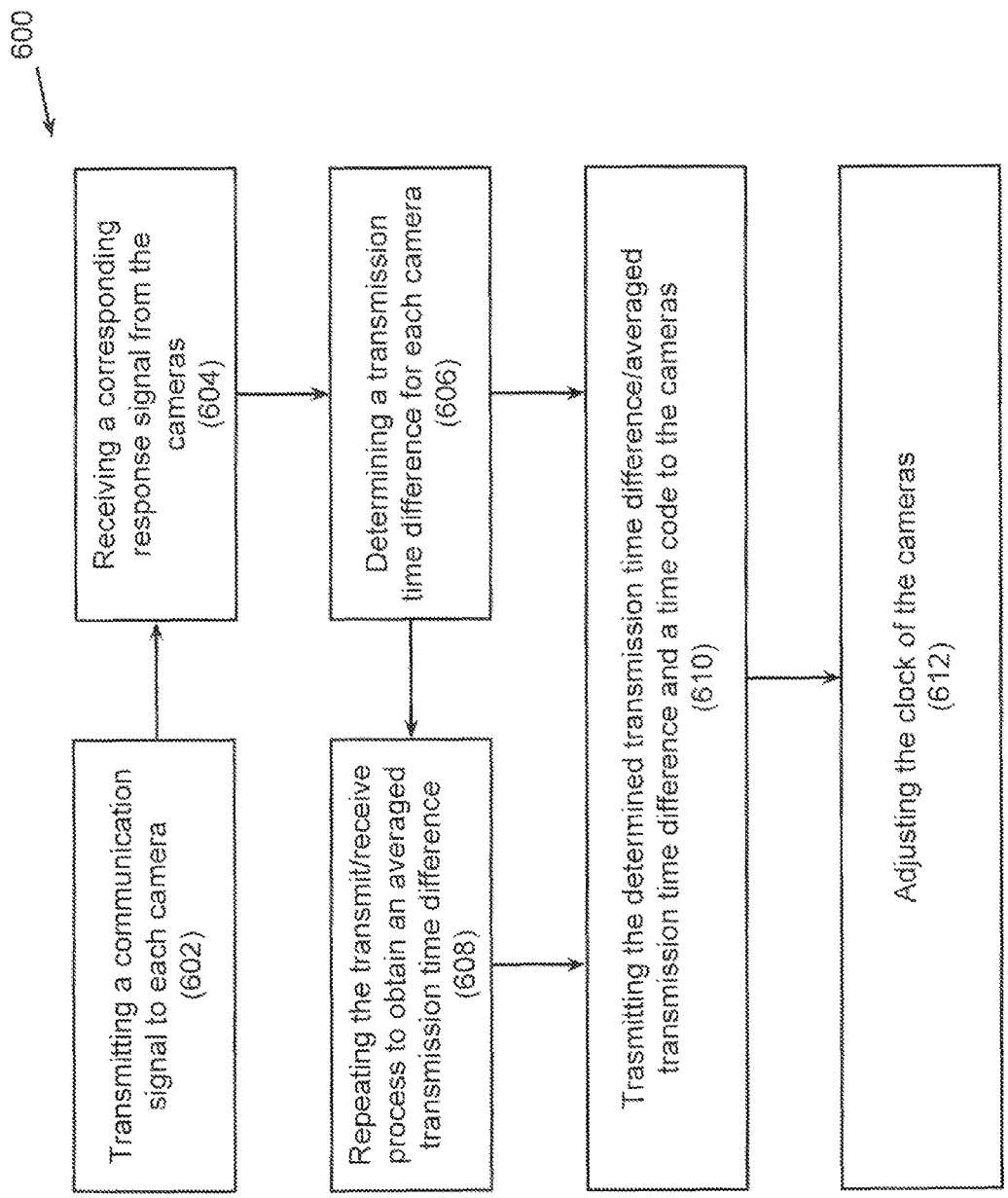
FIG. 6 shows a flow diagram illustrating the steps of performing time base synchronization in accordance with one embodiment of the present invention.

FIG. 6 shows a flow diagram 600 illustrating the steps of performing time base synchronization in the camera network in accordance with one embodiment of the present invention. The process begins with step (602), transmitting a communication signal from the controller or the 'master' camera to each of the cameras in the cameras network. Then, in step (604), the controller or the 'master' camera detects the response signal from each of the cameras. Based on these signals, the controller or the 'master' camera then determines a transmission time difference from the controller or the 'master' camera to each of the cameras in the camera network, as shown in step (606). An averaged transmission time difference may be determined in step (608) for improved transmission time difference accuracy by repeating the time difference measurements. Preferably, the controller or the 'master' camera maintains a list having operation parameters or data of each of the cameras in the camera network (each having its own camera identification code). In one embodiment, the controller or the 'master' camera may use their own time base as reference. However, in another embodiment, the controller or the 'master' camera may use a time base of any one of the cameras in the camera network as reference, and adjusts its own time base accordingly, without deviating from the scope of the invention.

Once the transmission time difference/averaged transmission time difference between the controller or the 'master' camera and each of the cameras in the camera network is determined, the controller or the 'master' camera, in step (610), transmits a receptive time base synchronization signal having a time code, and a respective determined transmission time difference/averaged transmission time difference, to each of the cameras in the camera network respectively. Then, each of the cameras in the camera network, upon receiving the time base synchronization signal, adjusts it local time base to substantially conform to that of the controller or the 'master' camera, as illustrated in step (612).

Figure 7A:
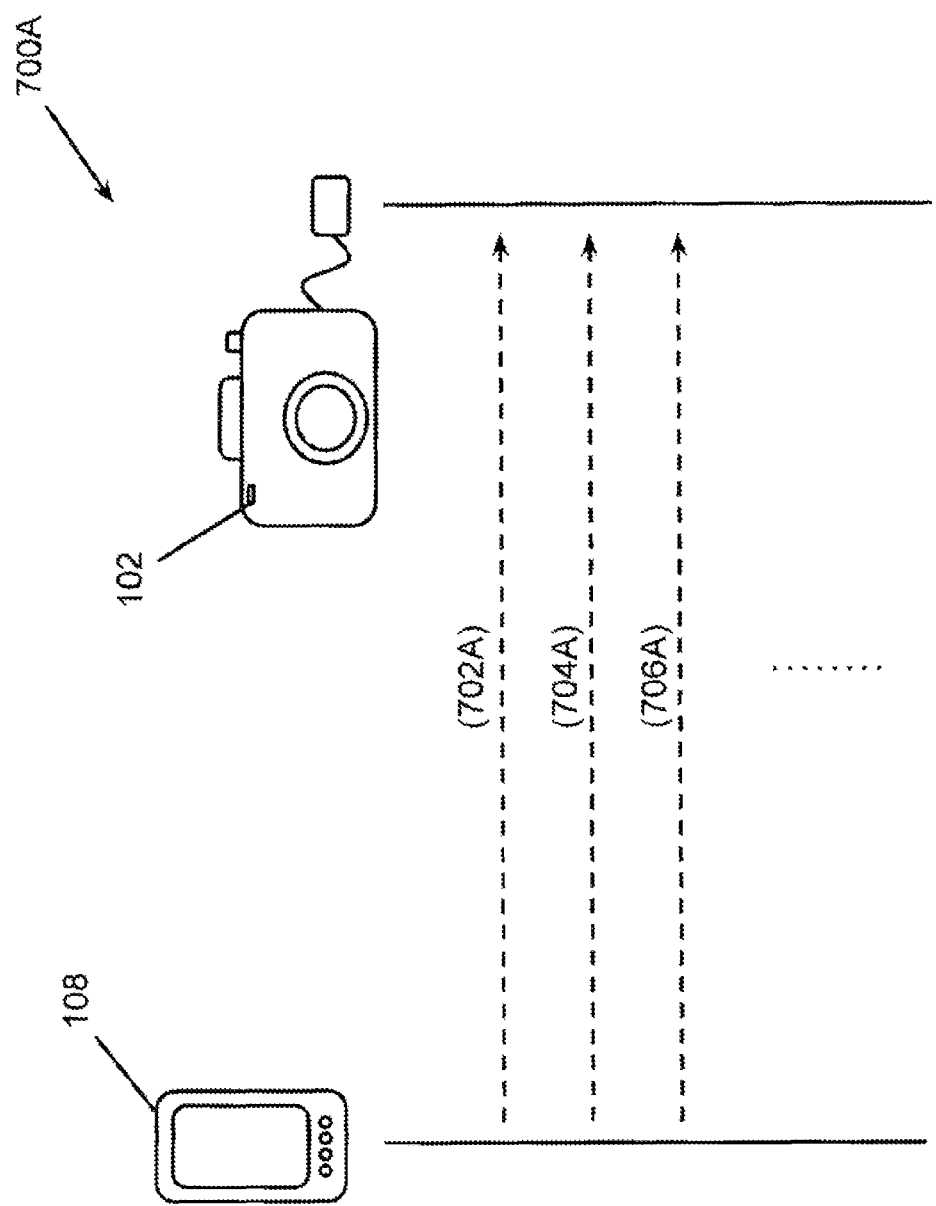
FIG. 7A illustrates a frame rate adjustment and synchronization process between the controller and the camera in the camera network of FIG. 1A.
Figure 7B:
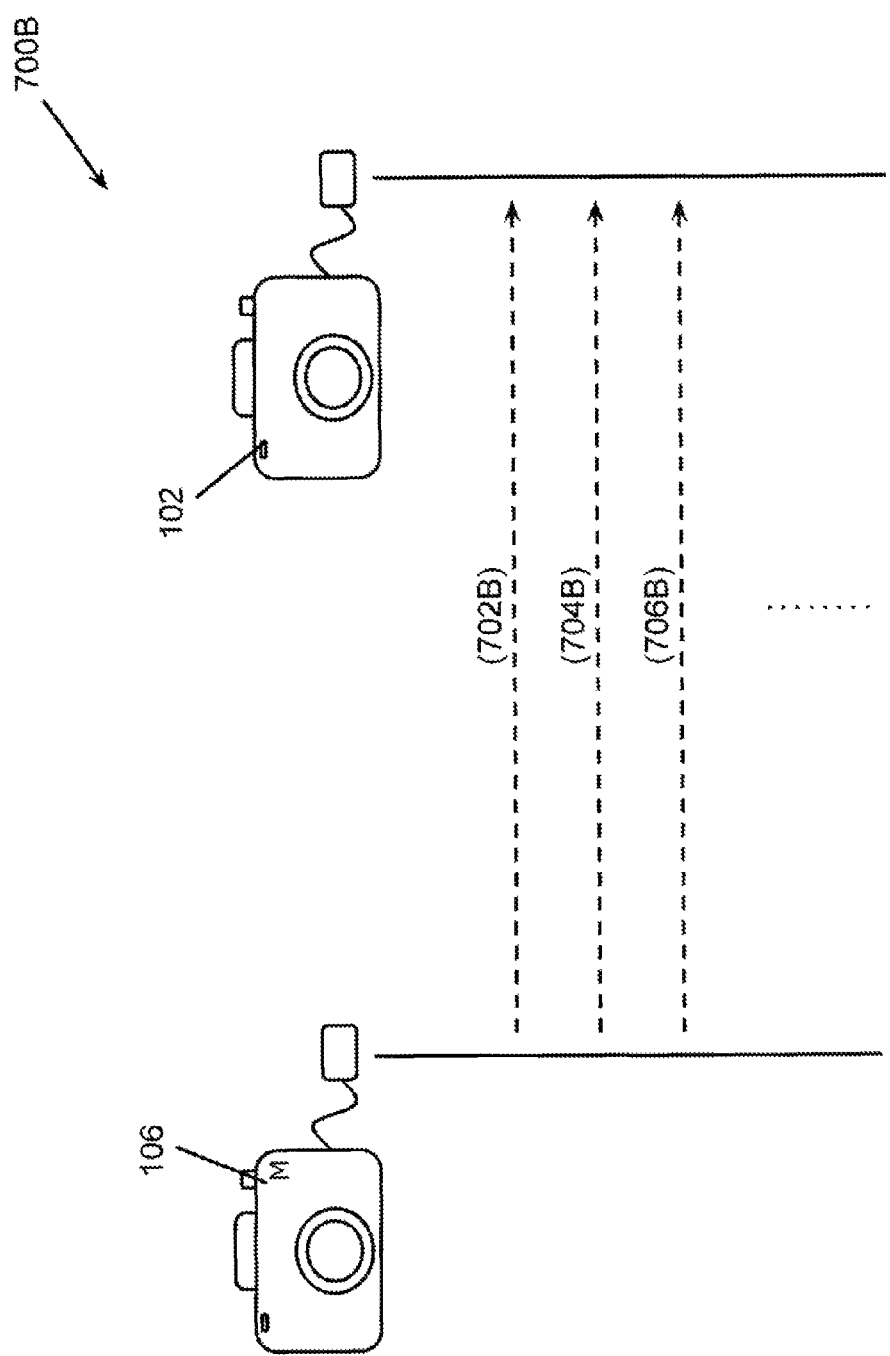
FIG. 7B illustrates a frame rate adjustment and synchronization process between two cameras in the camera network of FIG. 1B or 1C.

FIGS. 7A and 7B show the process 700A, 700B for adjusting and synchronizing the frame rate between the controller 108 and one of the cameras 102 in the camera network (embodiment of FIG. 1A), and/or between the 'master' camera 106 and one of the other cameras 102 in the camera network (embodiments of FIGS. 1B and 1C), so as to minimize the frame offset. Although only one camera 102 is shown in FIGS. 5A and 5B, a person skilled in the art could readily appreciate that the controller 108 or the 'master' camera 106 is operable to repeat the frame rate adjustment and synchronization process for different cameras in the camera network so as to minimize the frame offset among the cameras in the camera network.

As shown in FIGS. 7A and 7B, the controller 108 or the 'master' camera 106 is arranged to transmit a frame start signal to the other camera upon each frame initiation, as shown in steps (702A, 702B; 704A, 704; 706A, 706B), where each step correspond to one frame start signal transmission. For the embodiment of the camera network utilizing the controller 108, the controller 108 may be arranged to monitor the frame rate of at least one of cameras in the camera network, and uses the frame rate of one of the camera as a reference for the frame initiations. For the embodiment of the 'master' camera 106, the frame initiations at the 'master' camera itself are used.

Preferably, camera 102, upon receiving each frame start signal, obtains a time code from its local system. This time code is preferably time base synchronized with that of the controller 108 or the 'master' camera 106 based on the time base synchronization process described with respect to FIGS. 5A-6. Alternatively, the frame start signal transmitted from the controller 108 or the 'master' camera 106 to camera 102 includes a time code. In either case, camera 102 may include a log of time for receiving of the frame start signals from the controller 108 or the 'master' camera 106. This enables camera 102 to determine a frame rate based on the frame start signals received. In one embodiment, a frame time difference may be determined based on the difference in time code between two consecutive frame start signals. In other embodiments, more than two consecutive frame start signals may be used to obtain an averaged frame time difference.

Camera 102, upon determining the frame time difference, compares the frame time difference with a local frame time difference. If the comparison shows that the local frame time difference is smaller than the determined frame time difference, then camera 102 may gradually reduce its frame rate (increase frame time difference) until the frame offset between camera 102 and the controller 108 or the 'master' camera 106 is substantially minimized. Alternatively, if the comparison shows that the local frame time difference is larger than the determined frame time difference, then camera 102 may gradually increase its frame rate (reduce frame time difference), until the frame offset between camera 102 and the controller 108 or the 'master' camera 106 is substantially minimized. In either case, the end result would be that the time difference between the frames of camera 102 and the controller 108 or the 'master' camera 106 will be close to zero, i.e. the frame offset between the camera 102 and the controller 108 or the 'master' camera 106 is minimized. In one embodiment, this also means that the frame rates of the cameras are synchronized.

Ideally, the frame rate of the camera 102 is considered to be "synchronized" to the frame rate of the controller 106 (the frame rate of the camera associate with the controller) or the 'master' camera 108 when the frame offset is exactly zero. However, in one embodiment, the frame rate of the camera 102 is considered to be synchronized to the frame rate of the controller 108 or the 'master' camera 106 when the difference in the frame rate (or the frame time differences) is within a predetermined tolerance difference range and the frame offset is close to zero within a predetermined tolerance difference range. In other words, in this embodiment, the frame rates of the cameras in the camera network may be substantially but not necessarily exactly the same and there may be some residue frame offset. In a preferred embodiment, under any condition that the frame offset is beyond the tolerance difference range, the frame rate synchronization process may be repeated.

Figure 8:
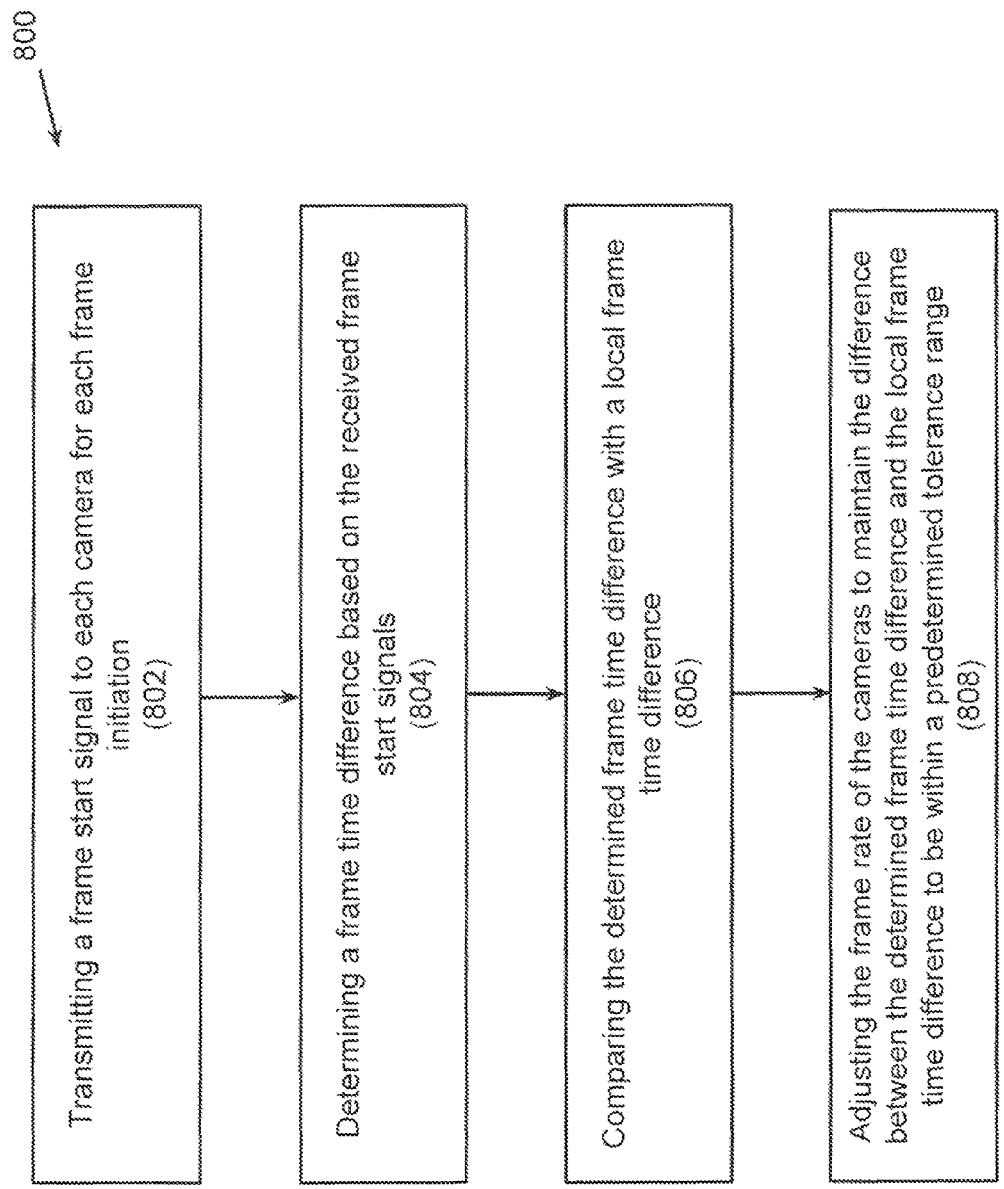
FIG. 8 shows a flow diagram illustrating the steps of performing frame rate adjustment and synchronization in accordance with one embodiment of the present invention.

FIG. 8 shows a flow diagram 800 illustrating the steps of performing frame rate adjustment and synchronization in the camera network in accordance with one embodiment of the present invention. The process begins with step (802), transmitting a frame start signal from the controller or the 'master' camera to each of the cameras in the cameras network upon each frame initiation at the 'master' camera or camera associated with the controller. Each of the cameras in the camera network then determines a frame time difference based on at least two consecutive frame start signals received from the 'master' camera or the controller, as shown in step (804). Upon determining the frame time difference indicative of the frame rate of the 'master' camera or the camera associated with the controller, in step (806), each camera compares its local frame time difference (i.e. local frame rate) with the determined frame time difference (i.e. the frame rate of the 'master' camera or the camera associated with the controller). If it is determined that the local frame rate at the respective camera deviates (higher or lower) from the frame rate of the 'master' camera or the camera associated with the controller, the cameras adjusts its respective frame rate so as to maintain the difference between the local frame rate and the frame rate of the 'master' camera or the camera associated with the controller to be within a predetermined tolerance range and hence to minimize the frame offset among the cameras and the controller, as indicated in step (808). In one embodiment, the cameras in the camera network may abruptly alter their frame rate to conform to the frame rate of the 'master' camera 106 or the camera associated with the controller 108. However, in an alternative embodiment, the cameras gradually adjust their frame rate to conform to the frame rate of the 'master' camera 106 or the camera associated with the controller 108.

Figure 9B:
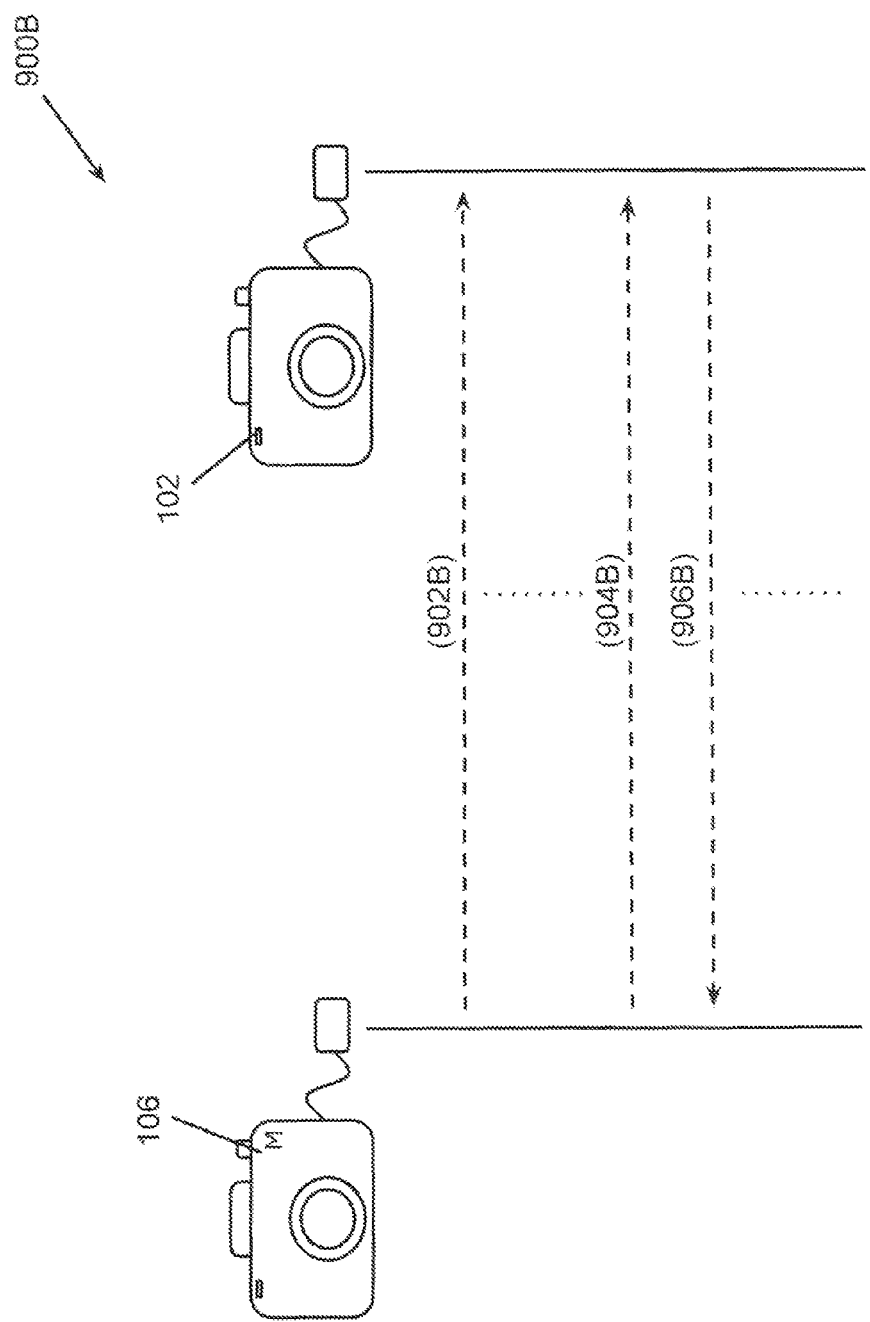
FIG. 9B illustrates a coordination process for capturing multimedia data using a number of cameras (controlled by a 'master') in accordance with one embodiment of the present invention.

FIGS. 9A and 9B show the process for coordinating the initiation and operation of the cameras in the camera networks of FIGS. 1A, 1B and 1C for capturing multimedia data simultaneously in a synchronous manner. Preferably, the cameras in the camera networks have had their time base synchronized and their frame offset minimized based on the methods illustrated in FIGS. 5A-8. The controller 108 or the 'master' camera 106 first sets up a targeted initiation time for all cameras in the camera network based on the determined transmission time difference (obtained during time base synchronization) of the cameras. Specifically, the controller 108 or the 'master' camera 106 looks for the camera with the maximum transmission time difference and determine a targeted initiation time based on the maximum transmission time difference. The targeting initiation time corresponds to the local time at the controller 108 or the 'master' camera 106 plus the maximum transmission time difference. For example, the controller 108 or the 'master' camera 106 determines that the maximum transmission time difference (for the camera that is furthest away) is 15 seconds and its local time is 2:02:25, it will calculate the targeted initiation time to be 2:02:40.

Once the targeted initiation time is determined, the controller 108 or the 'master' camera 106 sends an initiation command with the determined targeted initiation time to camera 102 (with maximum transmission time difference), as shown in step (902A, 902B). As could be readily appreciated, preferably, the controller 108 or the 'master' camera 106 first sends the initiation command to the camera with the largest transmission time difference, then to the camera with the second largest transmission time difference etc. In some cases, the controller 108 or the 'master' camera 106 may send the initiation command to the cameras at the same time. Upon receiving the command, the cameras, with their time base and frame rate synchronized, will wait for the targeted initiation time and activate to capture multimedia data simultaneously and synchronously.

During operation of the camera 102 for capturing multimedia data, the controller 108 or the 'master' camera 106 will continue to synchronize the time base and/or reduce the frame offset of the cameras in the camera network by dynamically adjusting the time base and the frame rates of the cameras using the methods as shown in FIGS. 5A-8, as shown in steps (904A, 904B; 906A, 906B).

Figure 10:
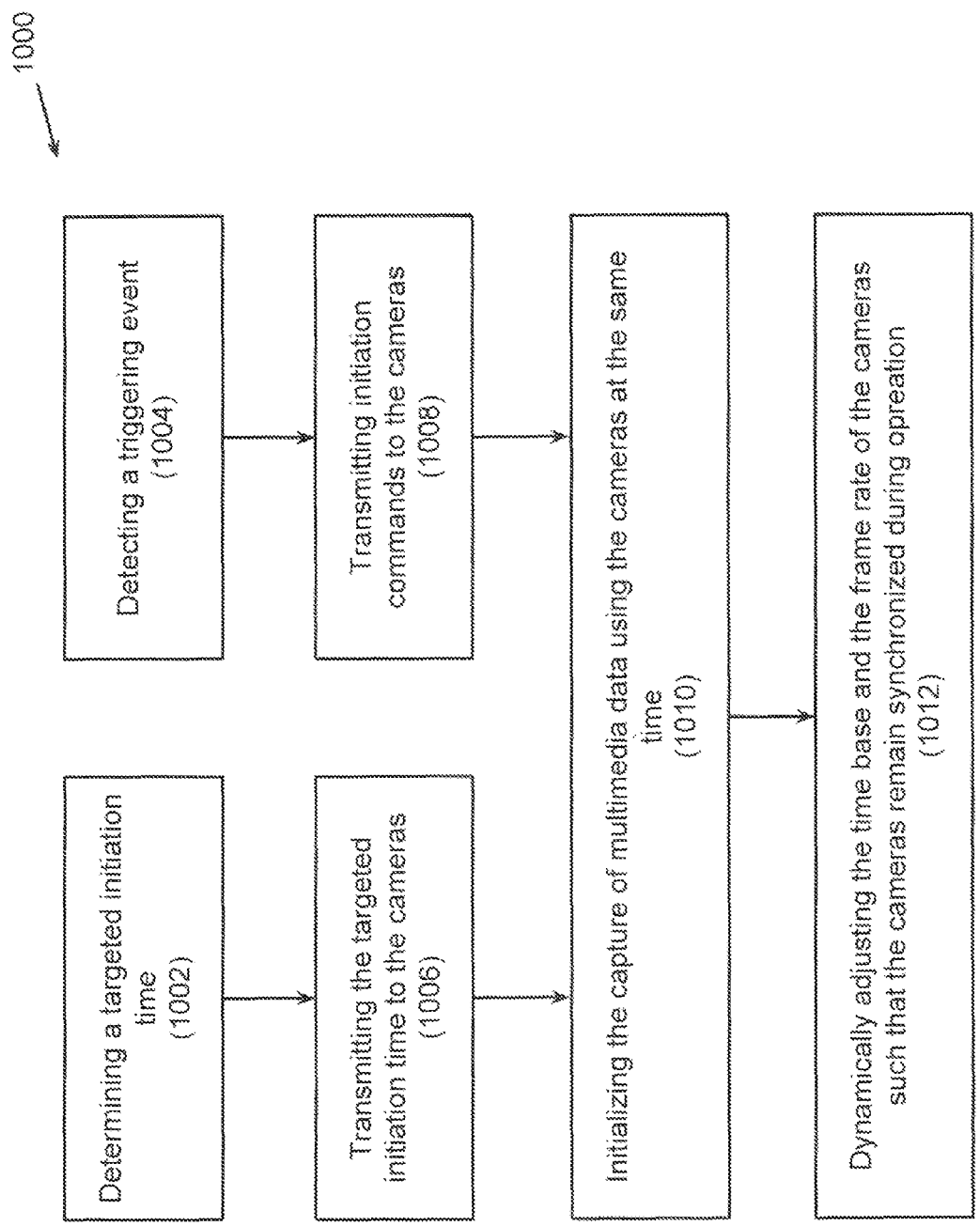
FIG. 10 shows a flow diagram illustrating the steps of coordinating the capturing of multimedia data using a number of cameras in accordance with one embodiment of the present invention.

FIG. 10 shows a flow diagram 1000 illustrating the steps of coordinating the initiation and operation of the cameras in the camera network in accordance with one embodiment of the present invention. In one embodiment, a controller or a 'master' camera is arranged to determine a targeted initiation time for initiating the cameras in the camera network. In one example, the controller or the 'master' camera may be arranged to receive a camera network activation request from the user. Upon receiving such request, the controller or the 'master' camera determines a targeted initiation time in step (1002) based on the maximum transmission time difference, as discussed above. Then, the controller or the 'master' camera sends an initiation command with the targeted initiation time to each of the cameras in the camera network in step (1006). Upon receiving the initiation command, the cameras wait for the targeted initiation time for activation to capture multimedia data in a simultaneous and synchronous manner in step (1010). During operation (capturing multimedia data), the controller or the 'master' camera dynamically (or periodically) adjusts the time bases and frame rates of the cameras such that the cameras remain synchronized at all time during operation, as indicated in step (1012).

In an alternative embodiment, such as in the camera network of FIG. 1C, the 'master' camera is arranged to detect an external triggering event indicative of an initiation request, as indicated in step (1004). Preferably, the triggering event may be a tactile signal, an infrared signal, an electromagnetic signal, a light signal, or an audible signal received at the 'master' camera (using the sensor in the electronic module). Upon determining the triggering event, the 'master' camera calculates the targeted initiation time based on the maximum transmission time difference. Once the targeted initiation time is determined, the 'master' camera sends an initiation command with the targeted initiation time to each of the cameras in the camera network in step (1008). Upon receiving the initiation command, the cameras wait for the targeted initiation time for activation to capture multimedia data in a simultaneous and synchronous manner in step (1010). During operation (capturing multimedia data), the 'master' camera dynamically (or periodically) adjusts the time bases and frame rates of the cameras such that the cameras remain synchronized at all time during operation, as indicated in step (1012).

The above description provides a number of different embodiments of camera networks, cameras, electronic modules, time base synchronization methods, frame rate synchronization methods, and camera network initiation and coordination methods. A person skilled in the art would readily appreciate that different embodiments disclosed above may be used interchangeably or in any combination, without departing from the spirit of the invention. Also, although the above description only discloses methods for synchronizing the time base and the minimization of the frame offset by dynamic adjustment of the frame rates, it should be noted that other types of operation parameters of the cameras may also be synchronized using the method disclosed.

The system for realizing the synchronization and operation of the cameras in the camera network may be arranged in the controller, the 'master' camera or the other cameras. In one alternative embodiment, the system may be distributed in the controller, the 'master' camera or the other cameras.

The camera synchronization and operation methods and systems in the present invention present a number of distinct advantages. Firstly, the use of cameras (with an electronic module) operable to communicate with each other or with a controller enables different types of cameras to have their operation parameters synchronized. This is particularly importantly for photographic applications (photo/video) which require more than one camera in operation at the same time. By dynamically adjusting the frame rate and time base of the cameras, the cameras may remain synchronized at all times (time base synchronized and frame offset minimized). Furthermore, the embodiment which allows for detection of triggering event for activating the cameras in the camera network enables a fully automated operation of the cameras. The synchronization and operation methods and systems disclosed substantially eliminate the human factors such as response time for pressing buttons from the system, thus enabling a more reliable and robust camera operation network. Other advantages of the present invention in terms of structure, function, cost-effectiveness, and manufacture ease and costs will become apparent to those skilled in the art, with reference to the specification.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for operating a camera network having a plurality of cameras, comprising:
communicating with the plurality of cameras to determine a time base and/or a frame rate for each of the plurality of cameras by facilitating communication with or between each of the plurality of cameras;
synchronizing the time base and/or the frame rate for each of the plurality of cameras to the time base and/or the frame rate of one of the plurality of cameras; and
coordinating a capture of multimedia data using the plurality of cameras with the synchronized time base and/or frame rate;
wherein communicating with the plurality of cameras to determine the time base for each of the plurality of cameras comprises:
transmitting at least one communication signal to each of the plurality of cameras; and
receiving at least one corresponding response signal from each of the plurality of cameras;
wherein synchronizing the time base of the plurality of cameras to the time base of the one of the plurality of cameras comprises:
determining at least one transmission time difference for each of the plurality of cameras based on a difference between a transmission time of the communication signal and a receiving time of the corresponding response signal; and
adjusting a clock time of each of the plurality of cameras based on the respective at least one determined transmission time difference such that the time base of each of the plurality of cameras is synchronized to the time base of the one of the plurality of cameras.

2. The method in accordance with claim 1, wherein the synchronization of the frame rate for each of the plurality of cameras comprises minimizing frame offset among the plurality of cameras in the camera network to be within a predetermined threshold or to be substantially zero.

3. The method in accordance with claim 2, wherein communicating with the plurality of cameras to determine a frame rate of each camera comprises:
transmitting a frame start signal to each of the plurality of cameras upon each frame initiation at the one of the plurality of cameras; and
determining a frame time difference at each of the plurality of cameras based on a time difference between at least two consecutive frame start signals received.

4. The method in accordance with claim 3, wherein synchronizing the frame rate for each of the plurality of cameras includes:
comparing the determined frame time difference between at least two consecutive frame start signals received with a frame time difference of each of the plurality of cameras; and
maintaining the frame time difference of each of the plurality of cameras to be within a predetermined range so as to substantially conform to the frame time difference of the one of the plurality of cameras.

5. The method in accordance with claim 4, wherein maintaining the frame time difference of each of the plurality of cameras to be within a predetermined range includes:
adjusting a frame rate of the cameras of which the frame time difference is beyond the predetermined range by altering the frame time difference of the respective camera such that the frame offset of the plurality of cameras is minimized to be within a predetermined threshold or to be substantially zero.

6. The method in accordance with claim 5, wherein coordinating the capture of multimedia data using the plurality of cameras with the synchronized time base and frame rate includes:
transmitting a targeted initiation time to each of the plurality of cameras; and
initializing the capture of multimedia data using the plurality of cameras at the same targeted initiation time.

7. The method in accordance with claim 6, wherein coordinating the capture of multimedia data using the plurality of cameras with synchronized time base and frame rate further includes:
dynamically adjusting the time base and the frame rate of the plurality of cameras when the plurality of cameras are capturing multimedia data such that the time base of the plurality of cameras remain synchronized and the frame offset among the cameras is minimized to be within a predetermined threshold or to be substantially zero during operation.

8. The method in accordance with claim 7, wherein coordinating the capture of multimedia data using the plurality of cameras with synchronized time base and frame rate includes:
detecting a triggering event for triggering the initiation of the capturing of multimedia data;
transmitting an initialization command to each of the plurality of cameras; and
initializing the obtaining of multimedia data using the plurality of cameras in response to the triggering event;
wherein detection of the triggering event includes detection of a tactile signal, an infrared signal, an electromagnetic signal, a light signal, or an audible signal.

9. The method in accordance with claim 1, wherein the multimedia data includes image, video or sound.

10. The method in accordance with claim 1, wherein the communication with or among the plurality of cameras is performed over a wireless communication link.

11. The method in accordance with claim 10, wherein the plurality of cameras are digital cameras each coupled with a communication module for enabling wireless communication.

12. A system for operating a camera network having a plurality of cameras, comprising:
a communication module for communicating with the plurality of cameras to determine a time base and/or a frame rate for each of the plurality of cameras by facilitating communication with or between each of the plurality of cameras;
a processor for synchronizing the time base and/or the frame rate for each of the plurality of cameras to the time base and/or the frame rate of one of the plurality of cameras, and for coordinating a capture of multimedia data using the plurality of cameras with the synchronized time base and/or frame rate;

wherein the communication module is arranged to:
transmit at least one communication signal to each of the plurality of cameras; and
receive at least one corresponding response signal from each of the plurality of cameras;
wherein the processor is arranged to:
determine at least one transmission time difference for each of the plurality of camera based on a difference between a transmission time of the communication signal and a receiving time of the corresponding response signal; and
adjusting a clock time of each of the plurality of cameras based on the respective at least one determined transmission time difference such that the time base of each of the plurality of cameras is synchronized to the time base of the one of the plurality of cameras.

13. The system in accordance with claim 12, wherein the processor is further arranged to minimize the frame offset among the plurality of cameras in the camera network to be within a predetermined threshold or to be substantially zero.

14. The system in accordance with claim 13, wherein the communication module is further arranged to:
transmit a frame start signal to each of the plurality of cameras upon each frame initiation at the one of the plurality of cameras; and
determine a frame time difference at each of the plurality of cameras based on a time difference between at least two consecutive frame start signals received.

15. The system in accordance with claim 14, wherein the processor is further arranged to:
compare the determined frame time difference between at least two consecutive frame start signals received with a frame time difference of each of the plurality of cameras;
maintain the frame time difference of each of the plurality of cameras to be within a predetermined range so as to substantially conform to the frame time difference of the one of the plurality of cameras; and
adjust a frame rate of the cameras of which the frame time difference is beyond the predetermined range by altering the frame time difference of the respective camera such that the frame offset of the plurality of cameras is minimized to be within a predetermined threshold or to be substantially zero.

16. The system in accordance with claim 15, wherein the processor is further arranged to:
transmit a targeted initiation time to each of the plurality of cameras;
initialize the capture of multimedia data using the plurality of cameras at the same targeted initiation time; and
dynamically adjust the time base and the frame rate of the plurality of cameras when the plurality of cameras are capturing multimedia data such that the time base of the plurality of cameras remain synchronized and the frame offset among the cameras is minimized to be within a predetermined threshold or to be substantially zero during operation.

17. The system in accordance with claim 16, wherein processor is further arranged to:
detect a triggering event for triggering the initiation of the capturing of multimedia data;
transmit an initialization command to each of the plurality of cameras; and
initialize the obtaining of multimedia data using the plurality of cameras in response to the triggering event; and
wherein detection of the triggering event includes detection of a tactile signal, an infrared signal, an electromagnetic signal, a light signal, or an audible signal.

18. The system in accordance with claim 12, wherein the communication with or among the plurality of cameras is performed over a wireless communication link.

19. The system in accordance with claim 18, wherein the plurality of cameras are digital cameras each coupled with a communication module for enabling wireless communication.

20. A method for operating a camera network having a plurality of cameras, comprising:
communicating with the plurality of cameras to determine a time base and/or a frame rate for each of the plurality of cameras by facilitating communication with or between each of the plurality of cameras;
synchronizing the time base and/or the frame rate for each of the plurality of cameras to the time base and/or the frame rate of one of the plurality of cameras; and
coordinating a capture of multimedia data using the plurality of cameras with synchronized time base and/or frame rate;
wherein communicating with the plurality of cameras to determine the time base for each of the plurality of cameras comprises:
transmitting at least one communication signal to each of the plurality of cameras; and
receiving at least one corresponding response signal from each of the plurality of cameras;
wherein synchronizing the time base of the plurality of cameras to the time base of the one of the plurality of cameras comprises:
determining a plurality of transmission time differences for each of the plurality of camera based on a difference between a transmission time of the communication signal and a receiving time of the corresponding response signal;
determining an averaged transmission time difference for each of the plurality of cameras based on the plurality of transmission time differences determined for each of the plurality of cameras and
adjusting a clock time of each of the plurality of cameras based on the respective determined averaged transmission time difference such that the time base of each of the plurality of cameras is synchronized to the time base of the one of the plurality of cameras.

* * * * *